United States Patent [19]

Hasegawa et al.

[11] 4,115,607

[45] Sep. 19, 1978

[54] PROCESS OF COATING ALUMINUM MATERIALS MOLDED BY EXTRUSION WITH POLYSILOXANE COATING

[75] Inventors: Mutsuo Hasegawa; Sunichi Segawa, both of Uozu; Yuji Koise, Funabashi; Hisao Okada, Ichikawa; Shiro Gomyo; Yoshiaki Kudo, both of Annaka, all of Japan

[73] Assignees: Yoshida Kogyo K.K.; Toa Paint Co., Ltd.; Shin-Etsu Chemical Co., Ltd., all of Japan; part interest to each

[21] Appl. No.: 780,427

[22] Filed: Mar. 23, 1977

[30] Foreign Application Priority Data

Mar. 29, 1976 [JP] Japan .................................. 51-34935

[51] Int. Cl.$^2$ .............................................. C23F 17/00
[52] U.S. Cl. .................................... 427/387; 29/527.3; 29/527.5; 72/46; 72/253 R; 148/13.1; 148/159; 148/6.27; 427/318; 427/401
[58] Field of Search ...................... 148/6.27, 159, 13.1; 427/318, 387, 401; 29/527.3, 527.5, 527.4; 72/46, 253 R

[56] References Cited

U.S. PATENT DOCUMENTS

| | | | |
|---|---|---|---|
| 2,871,141 | 1/1959 | Van Deusen | 427/318 |
| 2,991,204 | 7/1961 | Astle | 148/6.27 |
| 3,061,467 | 10/1962 | Vincent | 427/387 |
| 3,455,732 | 7/1969 | Hathaway | 427/387 |
| 3,532,537 | 10/1970 | Richards | 427/387 |
| 3,560,244 | 2/1971 | Neuroth | 427/387 |
| 3,899,370 | 8/1975 | Takahasi et al. | 148/159 |
| 3,935,349 | 1/1976 | Tergi et al. | 427/387 |
| 4,039,355 | 8/1977 | Takahasi et al. | 148/159 |

FOREIGN PATENT DOCUMENTS

| | | | |
|---|---|---|---|
| 2,519,132 | 6/1975 | Fed. Rep. of Germany | 148/6.27 |
| 1,540,632 | 1/1970 | Fed. Rep. of Germany | 427/318 |

*Primary Examiner*—John D. Smith
*Attorney, Agent, or Firm*—McGlew and Tuttle

[57] ABSTRACT

Shaped aluminum bars fresh from an extruder machine are coated with a specific organopolysiloxane composition while remaining uncooled and staying at temperatures not lower than about 250° C, or at a temperature between about 550° and 250° C. The thus coated aluminum bars are then, preferably, subjected to annealing. The coatings formed on the surfaces of the aluminum materials have a superior resistance to attack by chemicals, weather, stains and heat as well as excellent adhesion and mechanical properties.

11 Claims, 1 Drawing Figure

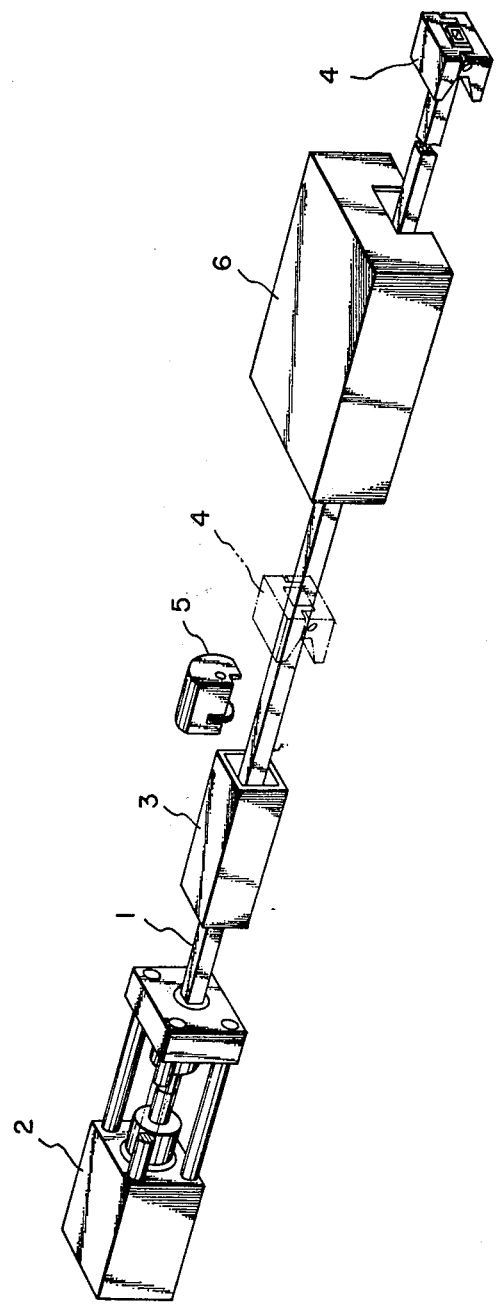

PROCESS OF COATING ALUMINUM MATERIALS MOLDED BY EXTRUSION WITH POLYSILOXANE COATING

BACKGROUND OF THE INVENTION

1. Field of the Invention

The present invention relates to a process for providing protective coatings on the surfaces of a material of aluminum or an aluminum-based alloy which is molded in shaped sections by extrusion.

2. Prior Art

According to conventional procedures for providing protective coatings on the surfaces of a material made of aluminum or an aluminum-based alloy (hereinafter referred to as an aluminum material) molded in shaped sections by extrusion in a molding plant, the aluminum material is cut in desired lengths and the thus cut pieces, optionally, after having been subjected to thermal aging or annealing, are cooled to room temperature and stored in the same molding plant. Then the materials are moved to a surface-treating plant where coating operations by a chemical oxidation method, anodic oxidation method, immersion coating, electrodeposition, or the like are carried out.

The above conventional process is economically disadvantageous because of its stepwise complexity, and because it requires operational facilities of a large scale and because of difficulties in process control, as well as because of its large consumption of electricity, steam, compressed air and fuels.

The conventional process tends to cause further difficult problems from the standpoint of economy, safety or environmental pollution. In the coating method which is a wet process carried out by use of aqueous coating materials, it is inevitable to spend very much money on the disposal of sewage or waste water, not to mention that the supply of large quantities of good quality water is required. When coating materials like paints, varnishes and lacquers are used, it is difficult to avoid the problems of fire hazards and explosion, air pollution, damage to workers' health, and the like, which may be caused by the presence of organic solvents contained in large quantities in the coating materials.

Furthermore, the quality of the coating films obtained by the conventional method generally has been found to be unsatisfactory, due to the fact that aluminum and aluminum-based alloys have a rather poor affinity with the conventional coating materials.

SUMMARY AND OBJECTS OF THE INVENTION

An object of the present invention is, therefore, to provide a novel and improved process for the coating of aluminum materials molded by extrusion, which are free from the above-described problems and difficulties.

Briefly, and in accordance with the present invention, the proposed method comprises coating the newly extruded aluminum material while its surface is maintained at temperatures between about 550° and 250° C. following extrusion with an organopolysiloxane-based material having a limited composition as set forth hereinafter. The thus coated aluminum material may be subjected to annealing at a temperature between about 170° and 200° C. for about 2 to 6 hours in order to further improve the mechanical strengths of the coatings.

The process of the present invention is very satisfactory not only for the reduction of costs in the production of coated aluminum materials and the absence of problems in workers' health and environmental pollution but also for the coating of films having excellent properties with respect to resistance to attack by chemicals, weather, stains and heat, as well as adhesion to metal surfaces and mechanical strengths.

DETAILED DESCRIPTION OF THE PREFERRED EMBODIMENTS OF THE INVENTION

According to the method of the present invention, no specific limitation is laid on the aluminum materials which as set forth hereinbefore include pure aluminum and aluminum-based alloys, insofar as they can be molded by extrusion. The extruded aluminum materials include plates, pipes, rods and wires as well as shaped sections useful for window sashes.

The extruder machine used for the extrusion of the aluminum materials may be of a conventional type and the conditions for extrusion are also the same as in the conventional extrusion processes. The temperature of extrusion is, for example, in the range from 500° to 580° C. The temperature of the surfaces of the newly extruded aluminum material is nearly the same as above, and then becomes to gradually less as the extruded material moves on the conveyer toward the coating device. The essential requirement in the process of the present invention is that the extruded material is coated with a specific organopolysilioxane coating composition while the surface temperature of the material remains not lower than 250° C. or, preferably, in the range from 350° to 550° C. Once the surface temperature of the extruded aluminum material becomes lower than 250° C., the coating operation will no longer exhibit a satisfactory result, even if carried out after re-heating to a temperature higher than 250° C.

The mechanism by which the effects of the method of the present invention are obtained may presumably be as follows. The surface of a newly extruded aluminum material remaining at a temperature not lower than 250° C. is so reactive that a strong bond can be formed between the surface and the coating composition. In this case, the coating composition must be an organopolysiloxane composition, and any substitutes which are made from organic resins, such as epoxy resins, polyester resins, polyvinyl chloride resins, methacrylic resins, polyamide resins and polyethylenes are not suitable for the purpose. This is because those organic resins have a relatively poor thermal stability and are not capable of forming a strong bond with the surface of the newly extruded aluminum material kept at 250° C. or above due to thermal decomposition and denaturation with coloration.

On the contrary, the organopolysiloxane compositions according to the present invention can give excellent results owing to their high thermal stability without danger of thermal decomposition at temperatures above 250° C. Further, it is presumed that the effectiveness of the present method is attributable in a sense to a great affinity between the aluminum metal surface and the Si-O-Si siloxane linkages as the basic structure of the organopolysiloxanes, as is evidenced by the fact that aluminosilicate compounds, such as zeolite, are extremely stable.

Furthermore, the organopolysiloxane coating composition once applied on the surfaces of aluminum material in accordance with the process of the present invention rapidly cures and hardens, so that the subsequent handling of the coated aluminum material is quite easy. Ordinary organic resins other than the organopolysiloxanes can not be applicable to coating operations in the process of the present invention since they are susceptible to decomposition and coloration.

With respect to a fluorocarbon resin which has a sufficiently high thermal stability comparable with an organopolysiloxane or a silicone resin, it should be noted that this organic resin is not suitable as a coating material for aluminum materials because of its poor adhesion to aluminum surfaces. Further, with respect to an inorganic coating material, such as a low-melting glass, which has an excellent thermal stability, such material can not be suitable for use in place of an organopolysiloxane composition, since the coating films formed with the inorganic material usually have brittleness and poor mechanical strengths and tend to break during the course of the subsequent stretching operation.

The reason for limiting the temperature of the extruded aluminum material to be coated, namely to between 550° and 250° C. is that a temperature lower than 250° C. brings about an insufficient bond between the coatings and coated surfaces as well as a decreased curing velocity which will cause inconvenience to the subsequent handling of the coated materials, while a temperature higher than 550° C. results in an excessively high curing velocity failing to produce smoothness in the surfaces and sufficient toughness in the coatings due to so-called "over-baking."

The organopolysiloxane composition applied on the extruded aluminum materials can cure within a short period of time directly after extrusion. When the cure has not proceeded to a satisfactory extent, it can be completed by the process of heat treatment or annealing to follow. The heat treatment or annealing process is a process which is undertaken on the extruded and coated aluminum material in order to improve its mechanical strength to a desired level.

The organopolysiloxane compositions used in the process of the present invention satisfy the following requirements, not to mention the capability of forming coatings having excellent physical and chemical properties on the aluminum surfaces.

(i) Sufficient fluidity so that the composition can be applied without the use of any solvents.

(ii) Considerably greater curing velocity so that the cured coatings can afford convenience to the subsequent handling of the coated material.

(iii) Formation of coatings having moderate flexibility so as not to be broken in the stretching process to follow.

The organopolysiloxane composition used in the process of the present invention comprises
(a) from 100 to 15 parts by weight or, preferably, from 70 to 15 parts by weight of an organopolysiloxane represented by the average unit formula

where $R^1$ is a monovalent hydrocarbon group and $a$ is a positive number in the range from 1.10 to 1.90 inclusive on the average, and (b) from 0 to 85 parts by weight or, preferably, from 30 to 85 parts by weight of a diorganopolysiloxane represented by the general structural formula

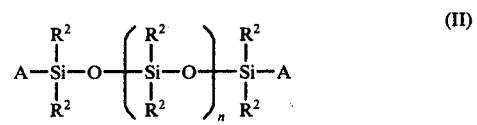

where $R^2$ is a monovalent hydrocarbon group, A is a group selected from the class consisting of monovalent hydrocarbon groups, alkoxy groups and a hydroxy group and $n$ is a positive integer, and having a viscosity in the range from 100 to 1,000,000 centistokes at 25° C.

The organopolysiloxane composition may, as needed added, be mixed with a small amount of a curing catalyst, such as an organic acid salt of cobalt, zinc, tin, lead or iron and platinum compounds.

The monovalent hydrocarbon groups represented by symbol $R^1$ in formula (I) above are preferably alkyl groups, such as methyl; aryl groups, such as phenyl; alkenyl groups, such as vinyl. It is advisable that groups $R^1$ in component (a) are composed of from 30 to 100 mole % or, preferably, from 30 to 80 mole % of methyl groups, from 0 to 70 mole % or, preferably, from 5 to 70 mole % of phenyl groups, and from 0 to 30 mole % of vinyl groups. It is also advantageous that component (a) is liquid at room temperature so that its blending with component (b) is easy. Component (a) may be solid at room temperature insofar as it is compatible with component (b), subject to being molten at an elevated temperature when blended.

The viscosity of the diorganopolysiloxanes as component (b) represented by formula (II) are limited to the range from 100 to 1,000,000 centistokes at 25° C., as defined above. Any diorganopolysiloxanes having a lower viscosity naturally contain relatively large amounts of low-boiling matter which is apt to be lost by evaporation at the high temperature in the coating process, while any diorganopolysiloxanes having a higher viscosity encounter difficulties in blending with component (a), although even higher viscosities are tolerable when component (a) has a sufficiently high fluidity.

The terminal groups at both chain ends of the diorganopolysiloxane as component (b) represented by symbol A are hydrocarbon groups, e.g. methyl, phenyl and vinyl groups, or may be a hydroxy group or alkoxy groups, such as methoxy and ethoxy groups. The monovalent hydrocarbon groups represented by symbols $R^2$ are not limited to a specific kind, but it is advisable that from 0 to 95 mole % or, preferably, from 10 to 80 mole % of the $R^2$ groups are alkyl groups, e.g. methyl groups; from 5 to 100 mole % or, preferably, from 10 to 90 mole % of the $R^2$ groups are aryl groups, e.g. phenyl groups; and from 0 to 50 mole % or, preferably, from 5 to 30 mole %, of the $R^2$ groups are alkenyl groups, e.g. vinyl groups.

The expected effect of component (b) in the organopolysiloxane composition used in the method of the present invention is to give flexibility to the coating films formed on the surface of the aluminum material molded by extrusion, but this component is not always indispensable in the composition, although its admixture with component (a) is desirable.

The methods for the preparation of components (a) and (b) are well known to those skilled in the art of silicone technology. For example, two or more kinds of organochlorosilanes are mixed together in a mixing ratio corresponding to the content of each kind of the siloxane units in the finished organopolysiloxane after co-hydrolysis and co-condensation with, optionally, organic solvents as the diluent, and the mixture is hydrolyzed and subjected to dehydration-condensation in the presence of a condensation catalyst to form siloxane linkages. When the reactions are performed with organic solvents as the diluent, the solvents are preferably removed by distillation after completion of the reactions to produce a solvent-free resin composition.

The presence of an organic solvent is advantageous in facilitating the blending of components (a) and (b) and in adjusting the viscosity of the resulting composition suitably for application. However, it is of course recommended not to use any organic solvents in order to avoid the problems which should be caused by the use of the organic solvents.

DESCRIPTION OF DRAWING

The FIGURE is a perspective schematic view showing the apparatus employed in the invention.

The process of the present invention will now be described, by way of example, with reference to the accompanying drawing.

As shown in the drawing, in the FIGURE, an aluminum bar 1, being continuously extruded from the die attached to an extruder machine 2, and allowed to cool in the atmosphere, advances into a coating machine 3 where the coating of the advancing bar is performed. At this position, the bar remains uncooled not lower than 250° C., and remains at a temperature between 550° and 250° C. The coating machine is not limited to any specific type, but it is preferably a machine for spray coating, for example, hot-melt airless spray coating. In the spray coating, the electrostatic coating technique, in which an electric potential difference is applied between the spray gun and the aluminum bar, is advantageously employed in order to attain improved adhesion and uniformity of the coatings on the aluminum surfaces.

The organopolysiloxane coating composition is heated prior to application to a temperature of 60° to 230° C. or so, variable in accordance with its nature, to have its viscosity decrease to a degree such that the spray can give uniform coating layers of the desired thickness, which is preferably in the range from 10 to 30 $\mu$m or, more preferably, from 10 to 20 $\mu$m.

The aluminum bar 1 having thus coated advances farther till its tip is caught by a puller 4 at the first position as shown in the drawing. This puller holding the aluminum bar at its tip with a certain tension in the air in order to prevent the coated surfaces from possible damage is moved in the extrusion direction by the extrusion force at the extrusion speed till one unit of extrusion in terms of bullets has been completed to form a continuous bar, for example, 30 m long. The length of the continuous bar can be controlled by the size of the bullet used.

The travelling bar is subjected to compulsory cooling, while passing under a cooling device 6 provided, for example, with a fan. During the cooling step, the organopolysiloxane coatings are cured to a substantial extent to give tackfree surfaces.

As soon as the treatment of the bullet has been completed, or the extruded bar has travelled to the maximum length with puller 4 at the tip at the second position as shown in the drawing, the bar is cut on the spot by a cutter 5 situated after coating machine 3. At the time of the cutting step, the coated bar is already cooled lower than 100° C., and there is no danger of damage on the surfaces.

The aluminum bar thus cut is released from puller 4 and taken away for other treatments and, simultaneously, the freed puller 4 is moved back to the first position to be ready for handling a new unit of extrusion.

The piece of the aluminum bar is subjected to stretching for the purpose of stress compensation, and then cut again in the desired accurate length. The aluminum bar thus treated is further subjected to annealing at 170° to 200° C. for 2 to 6 hours to form a finished product having optimum strengths. During this annealing operation, any insufficient curing of the organopolysiloxane coatings can be supplemented to produce a satisfactory product with high efficiency.

By virtue of the annealing step, for example, the pencil hardness of the coatings can be improved by 2 grades, or from H to 3H which is sufficient for most coated aluminum materials.

In the case of aluminum materials conventionally coated with an organic composition, such annealing at the high temperature as in the present invention should not be undertaken due to the thermal decomposition of the coating composition. In order to further illustrate the process of the present invention, several examples are given in the following.

The organopolysiloxanes (a-I) to (a-V) and the diorganopolysiloxanes (b-I) to (b-III) used in the examples are what were prepared by the following procedures.

Organopolysiloxane (a-I): A mixture of 5.5 moles of phenyltrichlorosilane, 2.0 moles of methylvinyldichlorosilane and 2.5 moles of dimethyldichlorosilane was subjected to co-hydrolysis. The resultant co-hydrolyzate in a 40% by weight solution in toluene was polymerized by condensation in the presence of a small amount of potassium hydroxide as the alkali catalyst, followed by removal of the toluene and other volatile matter by distillation, to finally produce the organopolysiloxane having the desired resin structure.

Organopolysiloxane (a-II): A mixture of 2.2 moles of methyltrichlorosilane, 3.9 moles of dimethyldichlorosilane, 2.9 moles of phenyltrichlorosilane and 1.0 mole of diphenyldichlorosilane was co-hydrolyzed, condensed and freed of solvent and other volatile matter in the same manner as in the preparation of organopolysiloxane (a-I) above, to produce the organopolysiloxane having the desired resin structure.

Organopolysiloxane (a-III): An organosiloxane having a small amount of residual hydroxy groups, prepared by the co-hydrolysis with a mixture of 2 moles of methyltrichlorosilane, 4 moles of dimethyldichlorosilane, 2 moles of phenyltrichlorosilane and 2 moles of diphenyldichlorosilane, was mixed with a methoxy-containing organosiloxane expressed by the formula $[(C_6H_5)(CH_3)_{0.67}SiO_{0.67}(OCH_3)]_3$ in a ratio such that equimolar amounts of the residual hydroxy groups and the methoxy-containing organopolysiloxane were attained in the organosiloxane mixture. The resultant mixture was subjected to co-condensation in the presence of tetrapropyl titanate as the condensation catalyst, followed by removal of volatile matter, to finally produce the organopolysiloxane having the desired resin structure.

Organopolysiloxane (a-IV): A mixture of 4 moles of phenyltrichlorosilane, 2.5 moles of methyltrichlorosilane, 1 mole of methylvinyldichlorosilane, 2 moles of dimethyldichlorosilane and 0.5 mole of trimethylchlorosilane was co-hydrolyzed, condensed and freed of solvent and other volatile matter in the same manner as in the preparation of organopolysiloxane (a-I), to finally produce the organopolysiloxane having the desired resin structure.

Organopolysiloxane (a-V): An organosiloxane having a small amount of residual hydroxy groups, prepared by the co-hydrolysis with a mixture of 2 moles of methylvinyldichlorosilane, 4 moles of dimethyldichlorosilane, 2 moles of phenyltrichlorosilane and 2 moles of diphenyldichlorosilane, was mixed with the same methoxy-containing organosiloxane in the same ratio as employed in the preparation of the organopolysiloxane (a-III). The resultant mixture was subjected to co-condensation, followed by removal of volatile matter, to finally produce the organopolysiloxane having the desired resin structure.

Diorganopolysiloxane (b-I): A mixture of 3.8 moles of dimethyldichlorosilane, 3.2 moles of diphenyldichlorosilane, 2 moles of methylvinyldichlorosilane and 1 mole of trimethylchlorosilane was subjected to co-hydrolysis and subsequently to condensation in the presence of an alkali catalyst, followed by removal of volatile matter, to finally produce the desired diorganopolysiloxane, having both chain ends terminated with trimethylsilyl groups and a viscosity of 480 centistokes at 25° C.

Diorganopolysiloxane (b-II): A mixture of 4.7 moles of octamethylcyclotetrasiloxane, 3.3 moles of octaphenylcyclotetrasiloxane, 1 mole of 1,3,5,7-tetramethyl-1,3,5,7-tetravinylcyclotetrasiloxane and 2 moles of dimethyldiethoxysilane was heated with agitation in the presence of a small amount of potassium hydroxide as the alkaline catalyst to effect polymerization. The reaction mixture was freed of volatile matter, to finally produce the desired diorganopolysiloxane having both chain ends terminated with dimethylethoxysilyl groups and a viscosity of 2,000 centistokes at 25° C.

Diorganopolysiloxane (b-III): A mixture of 2.7 moles of dimethyldichlorosilane, 3.7 moles of diphenyldichlorosilane, 3 moles of methylvinyldichlorosilane and 0.6 mole of trimethylchlorosilane was subjected to co-hydrolysis and condensation in the same manner as in the preparation of diorganopolysiloxane (b-I) above, followed by removal of volatile matter, to finally produce the desired diorganopolysiloxane having both chain ends terminated with trimethylsilyl groups and a viscosity of 100,000 centistokes at 25° C.

Further in the examples, the various test values or results were determined in accordance with the following.

Thickness, adhesion and pencil hardness of coating film are each determined in accordance with Japanese Industrial Standard (JIS) A 4706.

Impact strength was determined by the duPont impact tester to be expressed in cm, the falling distance, with 12.7 mm × 500 g.

Contact test with acid solution or with alkali solution was conducted by keeping the coated surface in contact with a 5% sulfuric acid solution or with a 1% aqueous solution of sodium hydroxide, respectively, for 48 hours and examined in accordance with JIS A 4706, to determine whether each test piece should pass the test.

Spraying with saline solution was evaluated by the manner such that an aqueous salt solution containing 5% sodium chloride and 0.026% copper(II) chloride was sprayed on the coated surface for 48 hours, and the state of the resulting surface was observed and recorded by ratings in cardinal in accordance with JIS H 8601.

Accelerated weathering was determined by subjecting the coated surface to weathering in accordance with JIS A 4706 for 250 hours to be recorded with respect of discoloration, adhesion and gloss retention of the coatings.

Appearance of the coated surface was visually examined immediately following the annealing step.

EXAMPLE 1 (EXPERIMENTS 1–5).

A bullet of aluminum-based alloy 6063 by AA Specification was continuously extruded through a die attached to an extruder machine at a velocity of 30 m/min. to form a continuous bar having the same cross-sectional shape as the die opening. The tip of the extruding bar was held and pulled by a puller so that it advanced afloat in the air through a coating machine. In the coating machine the extruding bar was spray-coated while its surface temperature remained at about 420° C., using an airless sprayer of hot-melt applicator Model VII made by Nordson Co. The bar having been coated and held by the puller was put to compulsory cooling by a cooler to a temperature below 100° C. and then it was cut by a cutter to form a piece having a length approximate to what was desired exactly.

The thus obtained piece of the coated bar was then taken off the coating and cooling line and then subjected to stretching for stress compensation by means of a pair of stretchers. The resulting piece was cut by another cutter in the exactly desired length, and then kept in an annealing oven at 180° C. for 5 hours to effect the annealing of the metal component and the curing of the coating composition to produce the finished product, which was useful as a window sash.

In the above spray-coating procedure, the coating composition was heated at 180° to 200° C. and sprayed all over the surfaces of the bar using four spraying rate-adjustable nozzles positioned around at a distance of about 25 cm from the bar.

The coating composition used in each of the Experiments No.1 to No.5 undertaken in this example was a mixture of organopolysiloxane (a-I) and diorganopolysiloxane (b-I) in a ratio indicated in Table I.

Tests were conducted to determine the various properties of the coatings formed on the finished product and coated surfaces, and the results are set out in the same table.

TABLE I

| Experiment No. | 1 | 2 | 3 | 4 | 5 |
|---|---|---|---|---|---|
| Organopolysiloxane (a-I), % | 10 | 20 | 30 | 40 | 50 |
| Diorganopolysiloxane (b-I), % | 90 | 80 | 70 | 60 | 50 |
| Thickness of coating film, μm | 15 | 16 | 15 | 15 | 16 |
| Adhesion of coating film | 100/100 | 100/100 | 100/100 | 100/100 | 91/100 |
| Pencil hardness | H | 3H | 3H | 3H | 4H |
| Impact strength, minimum | 40 cm | 50 cm | 50 cm | 50 cm | 40 cm |
| Contact test with acid solution | Passing | Passing | Passing | Passing | Passing |
| Contact test with alkali solution | Passing | Passing | Passing | Passing | Passing |

TABLE I-continued

| Experiment No. | 1 | 2 | 3 | 4 | 5 |
|---|---|---|---|---|---|
| Spraying with saline solution | 10 | 10 | 10 | 10 | 10 |
| Discoloration | None | None | None | None | None |
| Accelerated weathering Adhesion | 100/100 | 100/100 | 100/100 | 100/100 | 100/100 |
| Gloss retention | > 95% | > 95% | > 95% | > 95% | > 95% |
| Appearance of coated surface | Smooth | Smooth | Smooth | Smooth | Smooth |

Notes:
Experiment 1 is a control.
Percentage for (a-I) or (b-I) is by weight.

EXAMPLE 2 (EXPERIMENT 6)

The same procedures of coating, cooling, stretching and annealing as in Example 1 were repeated, using the same coating composition as in Experiment No.3 except that the surface temperature of the extruded aluminum bar at the entrance of the coating machine was about 270° C. instead of 420° C. The results of the tests performed of the thus coated material are set out in Table II to be given after Example 5 hereunder.

EXAMPLE 3 (CONTROL 7)

By way of comparison, the same procedure as in Example 2 above was repeated except that the surface temperature of the extruded aluminum bar at the entrance of the coating machine was about 230° C. instead of 270° C. The results of the tests are set out also in Table II.

EXAMPLE 4 (CONTROL 8)

By way of comparison, the same procedure as in Example 2 was repeated except that the surface temperature of the extruded aluminum bar at the entrance of the coating machine was about 570° C. instead of 270° C. The results of the tests are set out also in Table II.

EXAMPLE 5 (EXPERIMENT 9)

The same procedure as in Example 2 except that the surface temperature of the extruded aluminum bar at the entrance of the coating machine was about 420° C. instead of 270° C., and the coating technique was electrostatic coating with spray nozzles of 60 kilovolt. The results of the tests are set out in Table II.

TABLE II

| Experiment No. | 6 | 7 | 8 | 9 |
|---|---|---|---|---|
| Thickness of coating film, μm | 15 | 15 | 15 | 17 |
| Adhesion of coating film | 100/100 | 100/100 | 100/100 | 100/100 |
| Pencil hardness | 2H | H | 3H | 3H |
| Impact strength test with 50 cm falling distance | Passing | Passing | Fouling* | Passing |
| Contact test with acid solution | Passing | Passing | Passing | Passing |
| Contact test with alkali solution | Passing | Fouling** | Passing | Passing |
| Spraying with saline solution | 10 | 9 | 10 | 10 |
| Discoloration | None | None | None | None |
| Accelerated weathering Adhesion | 100/100 | 100/100 | 100/100 | 100/100 |
| Gloss retention | 95.8% | 94.6% | 95.2% | 95.6% |
| Appearance of coated surface | Smooth | Smooth | Less Smooth | Smooth |

Notes:
Experiments 7 and 8 are controls.
*Fouling due to peeling occurring to protruded parts, though recessed parts were found unpeeling.
**Fouling due to the occurrence of slight blisters.

EXAMPLE 6 (EXPERIMENTS 10–16)

The same procedures of coating, cooling, stretching and annealing as in Example 1 were repeated with the exception of the formulation of the coating compositions and the surface temperature of the extruded aluminum bar at the entrance of the coating machine both as indicated in Table III. The results of the tests are set out in the same table.

Table III

| Experiment No. | 10 | 11 | 12 | 13 | 14 | 15 | 16 |
|---|---|---|---|---|---|---|---|
| Formulation of coating composition, % by weight | (a-I): 30 (a-II):10 (b-I): 60 | (a-I): 30 (a-V): 10 (b-I): 60 | (a-III): 100 | (a-I): 30 (b-II): 70 | (a-IV): 30 (b-III): 70 | (a-IV):30 (b-I):70 | (a-IV):30 (a-II):10 (b-I): 60 |
| Surface temperature, °C | 520 | 470 | 570 | 450 | 560 | 230 | 280 |
| Thickness of coating film, μm | 15 | 15 | 15 | 15 | 15 | 15 | 15 |
| Adhesion of coating film | 100/100 | 100/100 | 100/100 | 100/100 | 100/100 | 100/100 | 100/100 |
| Pencil hardness | 2H | 2H | 2H | 2H | 3H | H - 2H | H - 2H |
| Impact strength, minimum | 50 cm | 50 cm | 40 cm | 50 cm | 40 cm | 50 cm | 50 cm |
| Contact test with acid solution | Passing | Passing | Passing | Passing | Passing | Passing | Passing |
| Contact test with alkali solution | Passing | Passing | Passing | Passing | Passing | Passing | Passing |
| Spraying with saline solution | 10 | 10 | 9.0 | 10 | 10 | 9.0 | 9.0 |
| Discoloration | None | None | None | None | None | None | None |
| Accelerated Adhesion | 100/100 | 100/100 | 100/100 | 100/100 | 100/100 | 100/100 | 100/100 |

Table III-continued

| Experiment No. | 10 | 11 | 12 | 13 | 14 | 15 | 16 |
|---|---|---|---|---|---|---|---|
| weathering Gloss retention | >95% | >95% | >95% | >95% | >95% | >95% | >95% |
| Appearance of coated surface | Smooth | Smooth | Less smooth | Smooth | Less smooth | Less smooth | Smooth |

Note: Experiments 12, 14 and 15 are controls.

What we claim is:

1. A process for providing protective coatings on the surface of a material composed of aluminum or an aluminum-based alloy molded by extrusion which comprises extruding said material; coating said material while its surface temperature is maintained between 550° and 250° C. following extrusion with an organopolysiloxane composition comprising
    (a) from 100 to 15 parts by weight of an organopolysiloxane expressed by the average unit formula

where $R^1$ is the same or different monovalent hydrocarbon group and $a$ is a positive number in the range from 1.10 to 1.90 inclusive, and
    (b) from 0 to 85 parts by weight of a diorganopolysiloxane represented by the general formula

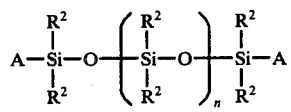

where $R^2$ is the same or different monovalent hydrocarbon group, A is a group selected from the class consisting of monovalent hydrocarbon groups, alkoxy groups and a hydroxy group and $n$ is a positive integer, and having a viscosity of from 100 to 1,000,000 centistokes at 25° C.

2. The method as claimed in claim 1, wherein said material is extruded at a temperature in the range from 500° to 580° C.

3. The method as claimed in claim 1, wherein said material is coated while its surface temperature is staying between 550° to 350° C.

4. The method as claimed in claim 1, wherein said organopolysiloxane composition is composed of from 70 to 15 parts by weight of component (a) and from 30 to 85 parts by weight of component (b).

5. The method as claimed in claim 1, wherein the monovalent hydrocarbon group represented by symbol $R^1$ is selected from the class consisting of methyl, phenyl and vinyl groups.

6. The method as claimed in claim 5, wherein from 30 to 80 mole %, from 5 to 70 mole % and from 0 to 30 mole % of the monovalent hydrocarbon groups represented by symbol $R^1$ are methyl, phenyl and vinyl groups, respectively.

7. The method as claimed in claim 1, wherein component (a) is liquid at room temperature.

8. The method as claimed in claim 1, wherein the group represented by symbol A is selected from the class consisting of methyl, phenyl and vinyl groups.

9. The method as claimed in claim 1, wherein the monovalent hydrocarbon group represented by symbol $R^2$ is selected from the class consisting of methyl, phenyl and vinyl groups.

10. The method as claimed in claim 9, wherein from 10 to 80 mole %, from 10 to 90 mole % and from 5 to 30 mole % of the monovalent hydrocarbon groups represented by symbol $R^2$ are methyl, phenyl and vinyl groups, respectively.

11. A process for providing protective coatings on the surface of a material composed of aluminum or an aluminum-based alloy molded by extrusion which comprises (i) coating said material while its surface temperature is maintained between 550° and 250° C. following extrusion with an organopolysiloxane composition comprising
    (a) from 100 to 15 parts by weight of an organopolysiloxane expressed by the average unit formula

where $R^1$ is the same or different monovalent hydrocarbon group and $a$ is a positive number in the range from 1.10 to 1.90 inclusive, and
    (b) from 0 to 85 parts by weight of a diorganopolysiloxane represented by the general formula

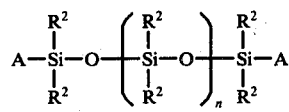

where $R^2$ is the same or different monovalent hydrocarbon group, A is a group selected from the class consisting of monovalent hydrocarbon groups, alkoxy groups and a hydroxy group and $n$ is a positive integer, and having a viscosity of from 100 to 1,000,000 centistokes at 25° C., and (ii) subjecting the thus coated material composed of aluminum or an aluminum-based alloy to annealing at a temperature from 170° to 200° C. for 2 to 6 hours.

* * * * *